(12) United States Patent
Butler (10) Patent No.: US 7,557,473 B2
(45) Date of Patent: Jul. 7, 2009

(54) ELECTROMAGNETIC RECIPROCATING ENGINE

(76) Inventor: Kala Butler, 30 Humboldt St., Trenton, NJ (US) 08618

( * ) Notice: Subject to any disclaimer, the term of this patent is extended or adjusted under 35 U.S.C. 154(b) by 0 days.

(21) Appl. No.: 11/942,644

(22) Filed: Nov. 19, 2007

(65) Prior Publication Data

US 2009/0128268 A1 May 21, 2009

(51) Int. Cl.
*H02K 33/00* (2006.01)
(52) U.S. Cl. ......................................... 310/20; 335/296
(58) Field of Classification Search ............. 310/15–35; 335/296
See application file for complete search history.

(56) References Cited

U.S. PATENT DOCUMENTS

| | | | |
|---|---|---|---|
| 3,676,719 A | 7/1972 | Pecci | |
| 4,317,058 A | 2/1982 | Blalock | |
| 5,457,349 A * | 10/1995 | Gifford | 310/24 |
| 6,552,450 B2 | 4/2003 | Harty et al. | |
| 2006/0071561 A1 * | 4/2006 | Chiu et al. | 310/20 |

* cited by examiner

*Primary Examiner*—Ramon M Barrera
(74) *Attorney, Agent, or Firm*—Darby & Darby P.C.

(57) ABSTRACT

An electromagnetic engine comprises an electromagnet having opposing magnetic poles at ends thereof. A non-magnetic rigid support is mounted for oscillatory stroke movement relative to the electromagnet. A crankshaft is coupled to the support; a sensor is coupled to the crankshaft and outputs a crankshaft position signal. First and second permanent magnets are affixed to the support on either side of the electromagnet and are oriented so as to present the same magnetic pole to each respective end of the electromagnet. The permanent magnets are spaced from one another by a distance approximately equal to the distance between the first and second ends of the electromagnet plus the stroke movement of the support. A timing circuit is operative to switch the electromagnet between first and second energized states in response to the crankshaft position signal. Also disclosed is an electromagnetic engine in which a piston moves along guide rails.

3 Claims, 6 Drawing Sheets

ELECTROMAGNETIC RECIPROCATING ENGINE

BACKGROUND OF THE INVENTION

1. Field of the Invention

This invention relates generally to a reciprocating engine, and more particularly to an electromagnetic reciprocating engine.

2. Discussion of the Related Art

Typical internal combustion engines comprise a piston that reciprocates within a cylinder. The cylinder is capped with a valve head. A combustion chamber is formed between the top of the piston, the cylinder, and the valve head. Into this combustion chamber, air and fuel are introduced, mixed, and subsequently ignited. The combustion of the fuel confined within the combustion chamber generates a force that causes the piston to be thrust down within the cylinder.

The bottom portion of the piston is operationally connected to a crankshaft. The linear motion of the piston within the cylinder causes the crankshaft to rotate. Thus, a linear reciprocating motion of the piston in transformed into rotational motion. The rotating crankshaft is used to drive further mechanical devices, such as driving the transmission of an automobile to allow the car to drive.

Automobiles powered by internal combustion engines include starter motors. Starter motors are used to start the combustion cycle of the engine. When the ignition key is turned, electrical power from the car's batteries is supplied to the starter motor. The starter motor rotates the crankshaft, which causes the pistons and valves to move so that air and fuel are drawn into the combustion chamber and ignited. Once the combustion cycle is started, the starter motor is no longer needed and the engine continues to run by the combustion of fuel.

In addition, an alternator is included. The alternator is connected to the crankshaft and the spinning of the crankshaft drives the alternator. The spinning of the alternator generates electricity, which may be used to power the car's electrical systems or to recharge the car's batteries.

Some attempts have been made to utilize electromagnets to provide driving force to provide reciprocal motion of pistons to drive an engine. U.S. Pat. No. 4,317,058 discloses a modified internal combustion engine. The pistons are replaced with permanent magnet pistons and an electromagnet is disposed at the outer end of each cylinder. The electromagnets are energized to generate a magnetic field that will repel the permanent magnet pistons.

U.S. Pat. No. 6,552,450 discloses a reciprocating engine including a piston and a cylinder. An electromagnet is connected to the cylinder and another electromagnet is connected to the piston. Thus, the electromagnet connected to the piston moves with the piston.

U.S. Pat. No. 3,676,719 discloses an electromagnetic motor that includes electromagnetic solenoids that are used to repel cores of ferrous metal to drive a gear. The drive gears drive a pinion gear which rotates a drive shaft that drives an alternator or generator through a pulley and belt assembly. The rotation of the drive shaft operates the alternator, which produces electrical energy to at least partially replenish the energy stored in the batteries.

The present invention is to provides an electromagnetic reciprocating engine that can be energized to repulse permanent magnets in order to provide the force necessary to drive a crankshaft of a car, and supply current for electrical systems in the car, while eliminating the need for a combustion tight seal and conventional complexities of combustion engines.

SUMMARY OF THE INVENTION

The present invention provides an engine that includes an electromagnet that can be energized to produce a magnetic field. When energized, the electromagnet has opposing magnetic poles, one pole at one end and an opposite pole at the opposite end. The electromagnet has a first magnetic pole orientation in a first energized state and a second magnetic pole orientation in a second energized state.

In one aspect, the engine of the present invention includes a crankshaft and a non-magnetic rigid support frame coupled to the crankshaft. The frame is mounted for oscillatory stroke movement relative to and in the direction of the axis of the electromagnet. Two permanent magnets are affixed to the frame and on either side of the electromagnet. Each of the permanent magnets is oriented to present the same magnetic pole to each respective end of the electromagnet. The permanent magnets are spaced from each other by a distance approximately equal to the distance between the first and second ends of the electromagnet plus the distance of stroke movement of the frame.

A sensor is coupled to the crankshaft to sense the position of the crankshaft and output a signal as a function of the crankshaft position. A timing circuit is included to control the energized state of the electromagnet. The timing circuit switches the switches the energized state of the electromagnet depending on the position of the crankshaft which is sensed by the sensor. Thus, the timing circuit causes the orientation of the magnetic field of the electromagnet to change.

When the electromagnet is energized, one of the permanent magnets is repelled and the other is attracted. This causes the frame to move which, in turn, causes the crankshaft to rotate. When the frame has moved so that the permanent magnet that is being attracted is close to the electromagnet, the timing circuit switches the energized state of the electromagnet in response to the sensor output signal. This changes the magnetic pole orientation of the electromagnet, which causes the close permanent magnet that was previously being attracted, to be repelled. Thus, the frame is moved in the opposite direction. This process of switching the energized state of the electromagnet is repeated, which results in reciprocating movement of the frame. The reciprocating movement of the frame causes the crankshaft to rotate.

In more particular aspects, an alternator is coupled to the crankshaft to convert at least a portion of the rotational energy of the crankshaft into electrical energy.

In still more particular aspects, a rechargeable power storage device is electrically connected to the timing circuit to supply power to energize the electromagnets. The alternator also provides electrical energy to recharge the rechargeable power storage device.

In another aspect, the engine of the present invention includes a crankshaft, first and second guides rails, and a piston coupled to the crankshaft. The piston includes engagement portions that are formed complementary to the guide rails and are engaged with the two guide rails so the piston is constrained to reciprocating oscillatory stroke movement. A permanent magnet is affixed to the piston. A sensor is coupled to the crankshaft to sense the position of the crankshaft and output a signal as a function of the crankshaft position. A timing circuit is included to energize the electromagnet in response to the sensor output signal.

When the electromagnet is energized a force is exerted on the permanent magnet, which causes the piston to move.

These and other aspects, features, and problems addressed by the invention can be further appreciated with reference to the discussion of certain embodiments and the drawings of such embodiments.

DETAILED DESCRIPTION OF CERTAIN EMBODIMENTS

Figure 1:
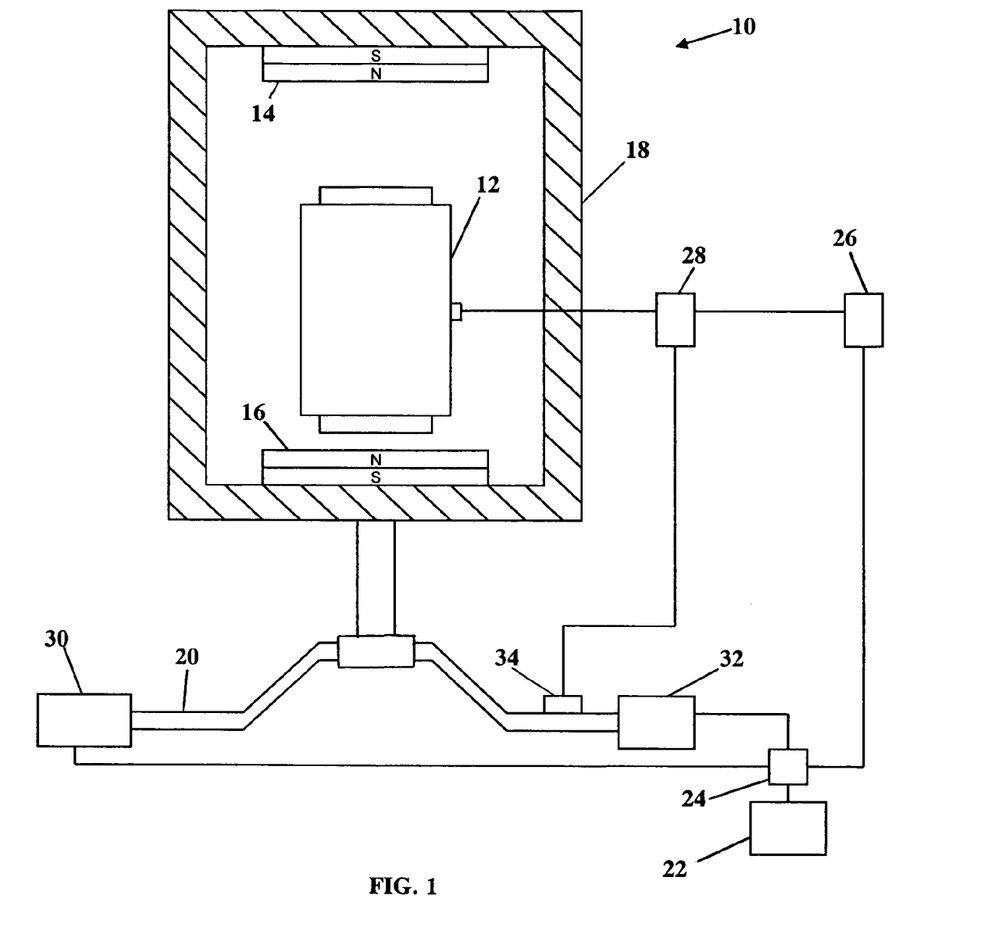
FIG. 1 is a view showing an electromagnetic engine according to one embodiment of the invention.

Referring to the drawings in detail, an electromagnetic engine 10 of one embodiment of the invention includes an electromagnet 12 and a frame 18 mounted for oscillatory movement. The frame 18 is coupled to a crankshaft 20. First and second permanent magnets 14 and 16 are affixed to the frame 18 and are positioned on opposite ends of the electromagnet 12, preferably in axial alignment with the electromagnet 12.

The electromagnetic engine 10 includes batteries 22, which provide a rechargeable power source. The batteries 22 are electrically connected through a switching circuit 24, an accelerator circuit 26, and a timing circuit 28 to the electromagnet 12. The batteries 22 are also electrically connected through the switching circuit 24 to a starter motor 30. As seen in FIG. 1, the batteries are also electrically connected through the switching circuit 24 to an alternator 32.

The electromagnetic engine 10 is driven by a magnetic field produced by the electromagnet 12. When electrical current is supplied to the electromagnet 12 it becomes energized and produces a magnetic field having opposite poles. The permanent magnets 14 and 16 are attached to the frame 18 and are both orientated to present the same magnetic pole toward the electromagnet 12. As seen in FIG. 1, the permanent magnets 14 and 16 are both presenting their north poles toward the electromagnet 12. When the electromagnet 12 is energized, depending on the orientation of the magnetic field, one of the permanent magnets 14 or 16 is repelled and the other permanent magnet is attracted. The direction of the electrical current supplied to the electromagnet 12 can be reversed, which reverses the orientation of the magnetic field. Thus, the permanent magnets 14 and 16 can be repelled and attracted by the electromagnet 12.

The attraction and repulsion of the permanent magnets 14, 16 that are attached to the frame 18 causes the frame 18, which is made of a non-magnetic material, to oscillate. The electromagnet 12 is fixed in position and does not move. The electromagnet 12 can be mounted to a non-magnetic support, which can be part of an the engine block. The fixed mounting of the electromagnet provides many great advantages such as eliminating the problems of providing electrical power to the electromagnet through wires. Since the electromagnet is stationary and does not reciprocate like the frame 18, the problems of wire chaffing and fatigue are eliminated. The magnets that do move with the frame 18, magnets 14, 16, are permanent magnets, which do not require an electrical power connection.

The frame 18 is connected to a crankshaft 20. The oscillation of the frame 18 causes the crankshaft 20 to rotate. The frame 18 can be mounted on tracks or guides that are connected to a support, which can be the same support or engine block that the electromagnet is mounted to so that the frame 18 is free to reciprocate. The electromagnetic engine 10 maybe used in an automobile, in which case, the crankshaft 20 would be used to drive the car.

The switching circuit 24 directs the flow of electrical power from the batteries 22 depending on the operational state of the electromagnetic engine 10. When the engine is being started, electrical power is directed to the starter motor 30. The starter motor 30 is connected to the crankshaft 20. The starter motor 30 rotates the crankshaft 20, which is connected to the frame 18, in order to move frame 18 so that the permanent magnets 14, 16 are in an optimal position when the electromagnet 12 is energized. The starter motor 30 is much like a starter motor found in a combustion engine that moves the pistons through the engine stroke so the engine can be started.

As can be seen in FIG. 1, a position sensor 34 is provided in proximity to the crankshaft 20. The position sensor 34 senses the rotational position of the crankshaft 20, which relates to the position of the frame and the permanent magnets 14, 16 with respect to the electromagnet 12. As one example, the position sensor can comprise an optical encoder or a magnetic encoder that generates signals based upon rotation of markings positioned on and around the crankshaft 20. It has been recognized that the environment of the engine may be very dirty, especially when the engine 10 is used in a car. Thus, to overcome the problems associated with dirt which may affect the reliability of an optical encoder, a magnetic encoder may be used. The sensor 34 is in communication with the timing circuit 28 so that the signals relating to the position of the crankshaft can be provided to the timing circuit 28. The signals from sensor 34 can be used by the timing circuit to determine the position of the crankshaft 20 and frame 18.

Depending on the positional information, the timing circuit 28 controls when the electromagnet 12 is energized. The timing circuit 28 also controls the direction of current flow to the electromagnet in order to control the orientation of the magnetic field of the electromagnet 12. The timing circuit can generate a pulse train that energizes the electromagnet or can drive a further circuit (not shown) that latches signals from the timing circuit and drives a current into the coil of the electromagnet.

Figure 2:
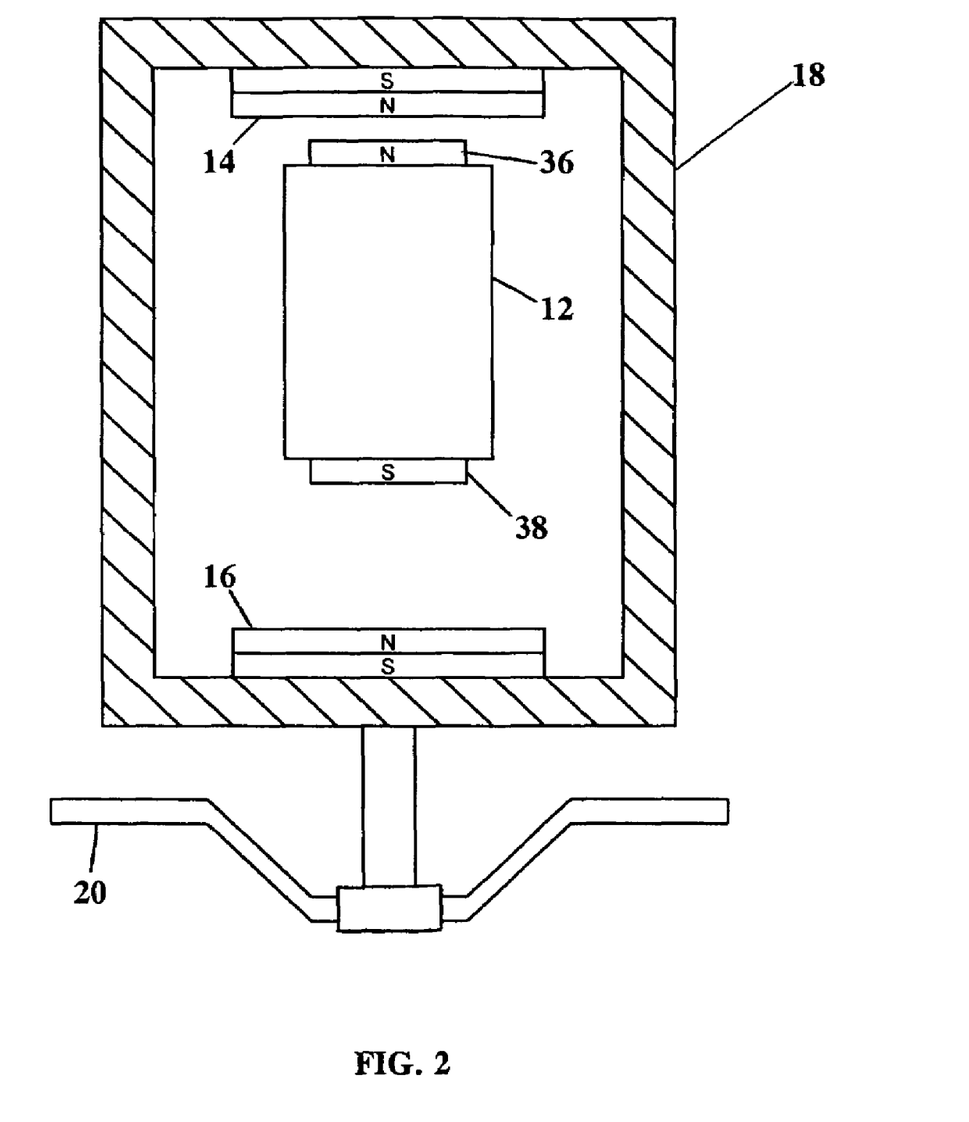
FIG. 2 is a view thereof in one state.

FIGS. 2-5 show different positional states of the frame and crankshaft as the frame progresses through its stroke. The electromagnet 12 is also shown in different states of energization such that opposite poles 36 and 38 of the electromagnet have different orientations, which is controlled by the timing circuit 28 as a function of the position of the crankshaft and frame. FIG. 2 shows the frame 18 near the beginning of its stroke cycle in a position such that permanent magnet 14 is proximate to the electromagnet 12. The electromagnet 12 is energized by timing circuit 28 such that the pole 36, which is closest to permanent magnet 14, is north. This causes the permanent magnet 14, which is oriented to present its north pole toward the electromagnet 12, to be repelled causing the frame 18 to move.

Figure 3:
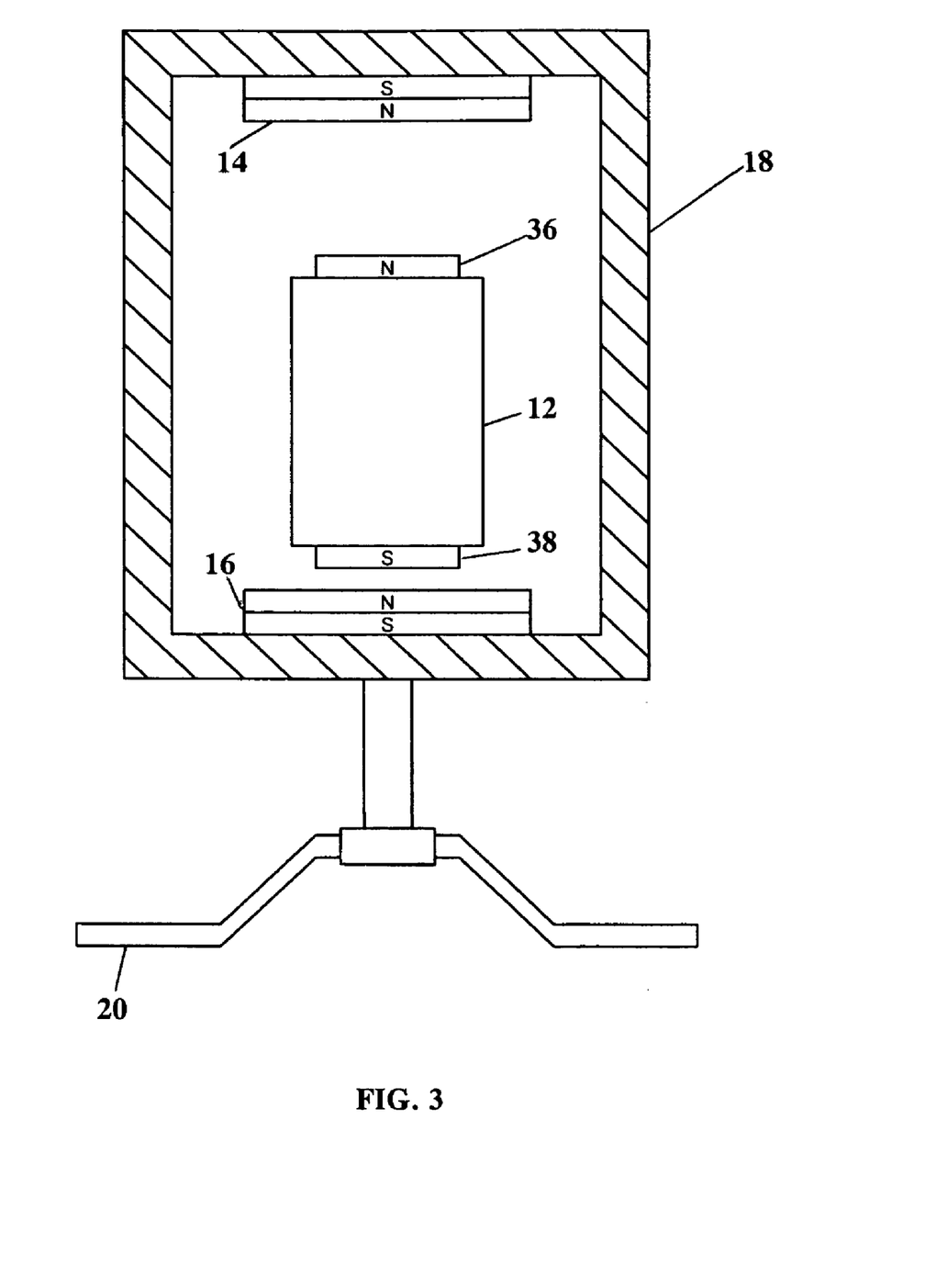
FIG. 3 is a view thereof in a second state.

As shown in FIG. 3, the frame 18 has moved and progressed in its stroke so that permanent magnet 16 is proximate to pole 38 of the electromagnet 12. During this movement of the frame 18, the timing circuit 28 has maintained the electromagnet 12 in the same magnetic orientation. Thus, pole 38 still has a south orientation. Therefore, as magnet 14 is being repelled, magnet 16 is being attracted. This arrangement helps increase the efficiency of the electromagnetic engine 10 because rather than only relying on one pole of the electromagnet to do the work, both poles are utilized. Therefore, one of the poles of the magnetic field produced by the electromagnet 12 is not wasted, both are used to move the frame 18.

As the distance between a permanent magnet and the electromagnet increases, the magnetic force between them decays and as the distance between a permanent magnet and the electromagnet decreases, the magnetic force between them increases according to known physical principles. Accordingly, as permanent magnet 14 is being repelled by the electromagnet 12, the magnitude of the force of repulsion decreases as the distance between the permanent magnet 14 and the electromagnet 12 increases. However, the distance between the permanent magnet 16 and the electromagnet 12 is simultaneously decreasing, which results in an increase in the force of attraction between the permanent magnet 16 and the electromagnet 12. Thus, as the frame 18 moves through its stroke, the force between one of the permanent magnets and the electromagnet is decreasing as the force between the other permanent magnet and the electromagnet is increasing.

Figure 4:
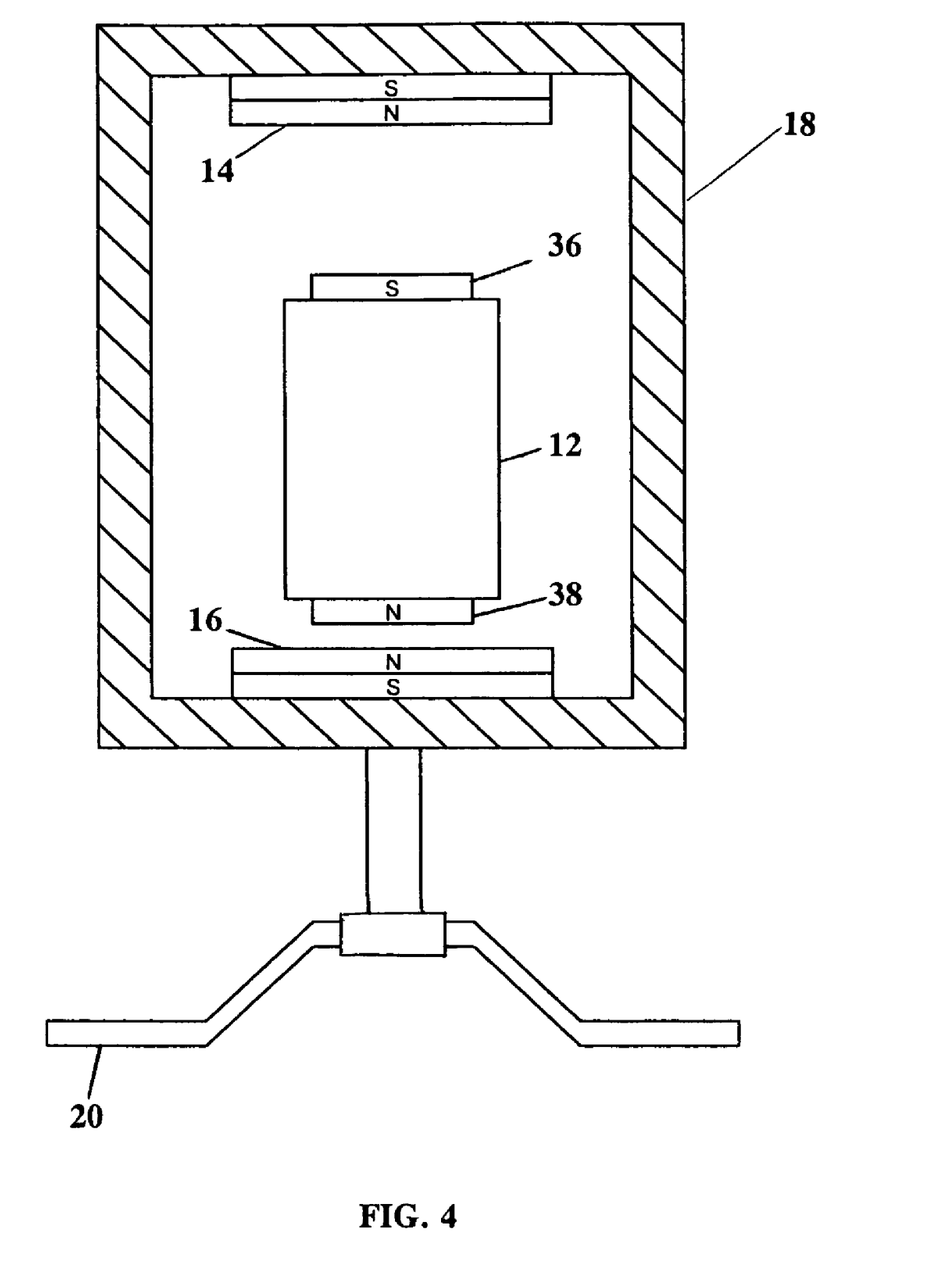
FIG. 4 is a view thereof in a third state.

As frame 18 continues to progress through its stroke and the crankshaft 20 rotates past the center position, the timing circuit 28 reverses the direction of the current supplied to the electromagnet 12 which reverses the orientation of the magnetic field of the electromagnet as shown in FIG. 4. Pole 38, which is proximate to permanent magnet 16, now has a north orientation, which causes magnet 16 to be repelled.

The timing of the change in direction of the current of the electromagnet, which results in a reversal of the orientation of the magnetic field of the opposite pole electromagnet, can be timed for maximum efficiency. As the crankshaft approaches the top dead center position with one of the permanent magnets approaching its closest position with respect to the electromagnet, the timing circuit can initiate the reversal of the current flow to the electromagnet. Since there will be some small delay in the reversal of the magnetic field orientation, there will be a transient phase in the electromagnet. The timing circuit is timed so the that transient phase occurs as the crankshaft is approaching the top dead center position so the electromagnet will be energized to repel the permanent magnet on the frame after passing top dead center for maximum efficiency. The duration of the transient phase should be reduced as much as possible because this occurs when the distance between one of the permanent magnets and the electromagnet is smallest, which is when the force between the electromagnet and the permanent magnet is strongest. Thus, starting the reversal of orientation of the magnetic field too late will result in loss of efficiency of the repulsion between the magnets as the frame changes direction in its stroke.

Figure 5:
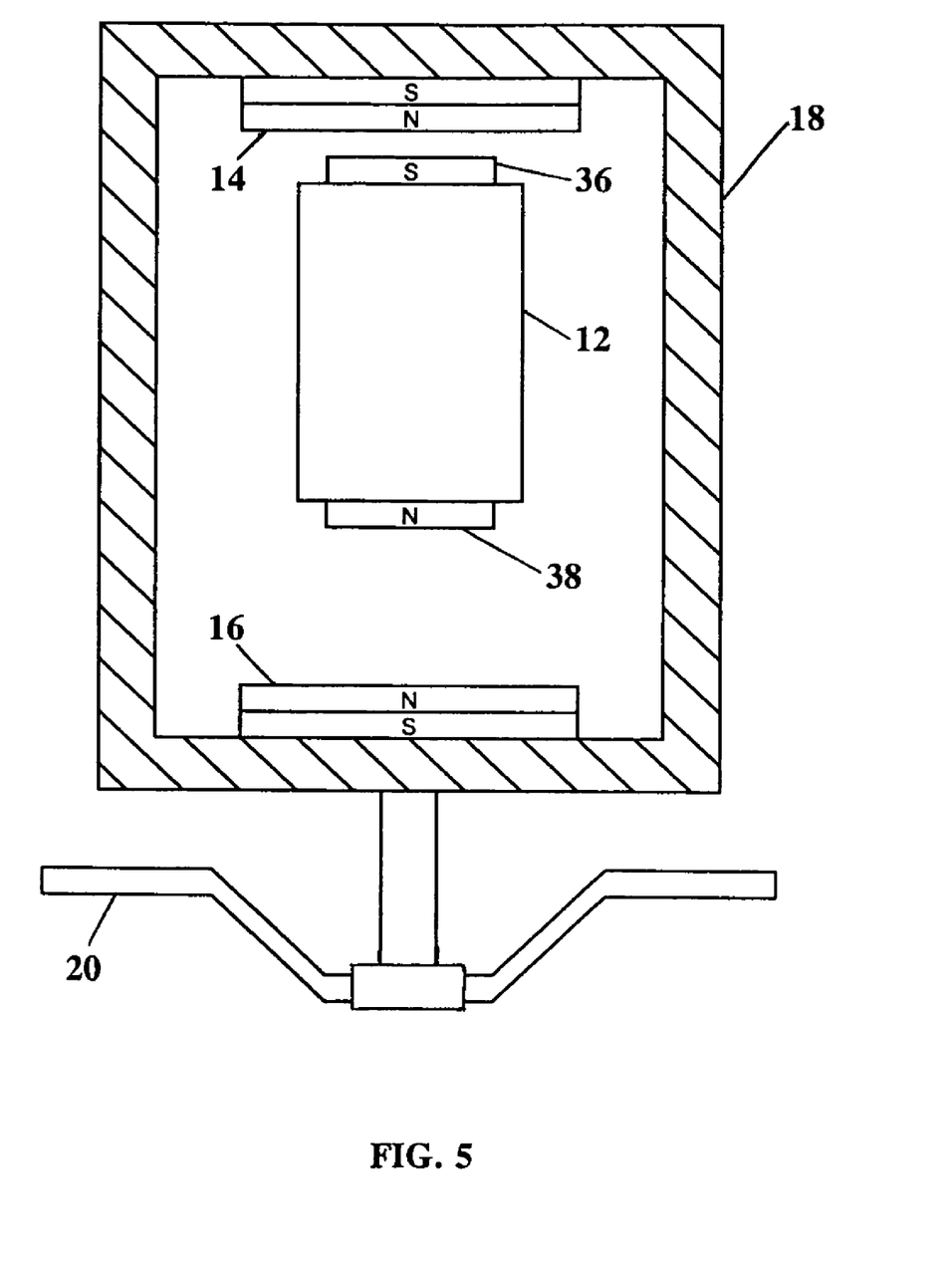
FIG. 5 is a view thereof in a fourth state.

As shown in FIG. 5, the frame 18 has progressed in its stroke and moved so that permanent magnet 14 is now again proximate to pole 36 of the electromagnet 12. During this movement of the frame 18, the timing circuit 28 has maintained the electromagnet 12 in the same magnetic orientation. Thus, pole 36 is still south orientation. Therefore, as magnet 16 is being repelled, magnet 14 is being attracted. At this point the crankshaft 20 has nearly completed a full rotation and the frame 18 nearly a full stroke cycle. As the crankshaft rotates past the center position, the timing circuit 28 will again reverse the direction of the current supplied to the electromagnet 12 which reverses the orientation of the magnetic field of the electromagnet 12 causing the direction of the stroke of the frame 18 to change. Thus, the frame 18 can be oscillated, causing the crankshaft 20 to rotate.

The stoke distance is approximately equal to the distance between the permanent magnets 14 and 16 and the ends of the electromagnet 12. The stroke distance is "approximately" equal, meaning it is equal to that distance plus assembly tolerances for maximum efficiency so that the permanent magnets and the electromagnet come as close as possible without impacting each other as the frame moves through its stroke cycle. Some efficiency in terms of use of the magnetic field strength to repel the permanent magnets can be sacrificed by slightly increasing the distance between the permanent magnets and the electromagnet, e.g., when there are multiple frame/electromagnet assemblies driving the crankshaft. Further, multiple frame/electromagnet assemblies attached to the crankshaft at a different stroke offset in order to improve the balance of the engine. For example, as one frame is in its down-stroke, another frame can be in the up-stroke.

As shown in FIG. 1, an accelerator circuit 26 is included. The accelerator circuit 26 controls the amount of power being supplied to the electromagnet 12. By controlling the amount of power supplied to the electromagnet 12, the strength of the magnetic field produced is governed. In turn, the force of repulsion and attraction of the permanent magnets 14, 16 is influenced. The change in the electromagnetic field varies the speed at which the frame 18 is oscillated, the speed at which the crankshaft 20 rotates, and the power transferred to the crankshaft over time. Thus, the speed of the electromagnetic engine 10 can be controlled using the accelerator circuit. In the case the electromagnetic engine is used to drive an automobile, the accelerator circuit 26 is in communication with an accelerator pedal used by the driver. Thus, using the accelerator pedal the driver can control the speed at which the automobile is traveling.

In particular, the accelerator circuit controls the amount of power being supplied to the electromagnet's timing circuit 28. In one implementation, the amplitude of the pulse train produced by the timing circuit is increased to cause a greater current to flow in the coil of the electromagnet and cause a concomitant change in the magnetic field produced. The stronger the magnetic field, the greater (and faster) the repulsion and attraction of the electromagnet to the permanent magnets 14, 16.

The electromagnetic engine 10 also includes an alternator 32 connected to the crankshaft 20. The crankshaft 20 is connected to the alternator 32 in order to spin the alternator 32 to produce electrical power. The alternator 32 is electrically connected to batteries 22 through switching circuit 24. The alternator 32 converts at least a portion of the energy of the engine and rotating crankshaft 22 into electrical energy. The electrical energy is used to at least partially recharge the batteries 22. For example, if the engine 10 were used to drive an automobile, when the automobile is traveling down hill or is at idle, the alternator 32 replenishes the batteries 22. The electrical energy may also be passed through a voltage regulator before being sent to the batteries.

Figure 6:
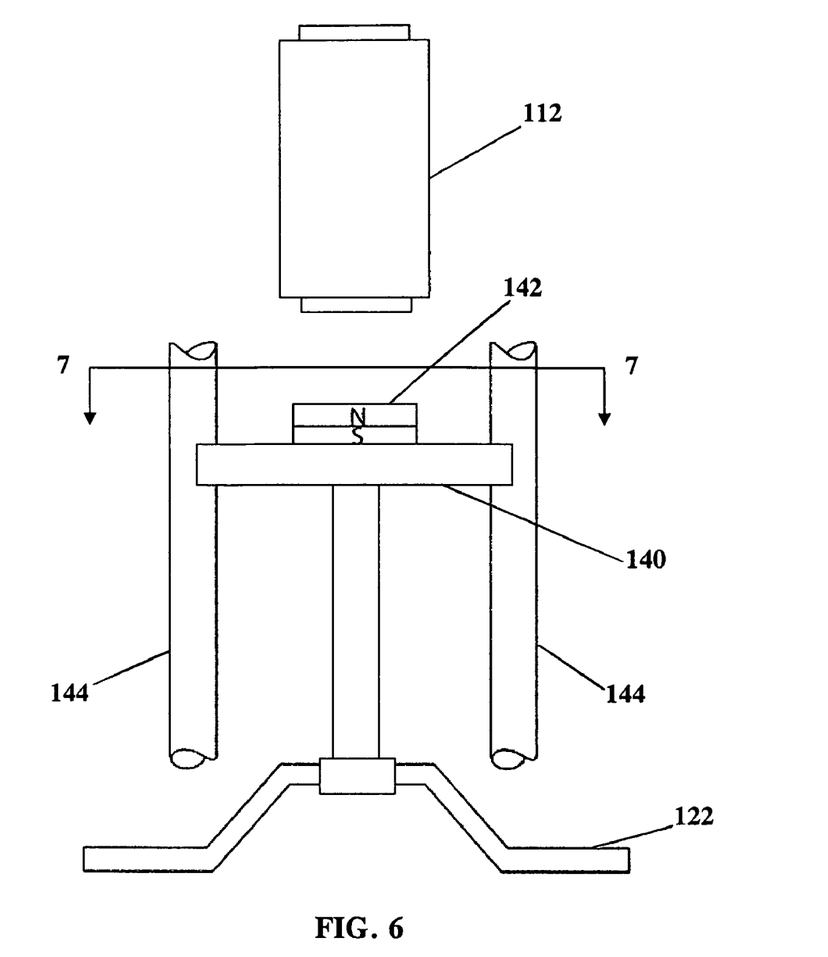
FIG. 6 is a view showing an electromagnetic engine according to another embodiment.
Figure 7:
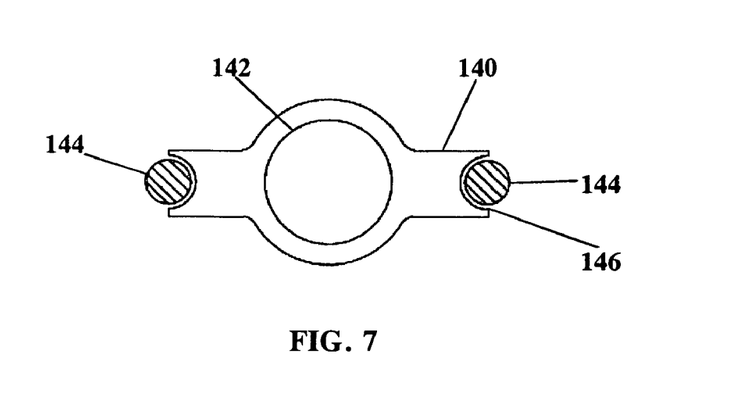
FIG. 7 is a cross-sectional view along line 7-7 of FIG. 6.

FIGS. 6 and 7 illustrate another mounting arrangement of an electromagnet 112 and a piston 140. The electromagnet 112 is mounted in a fixed position and does not move relative to the piston 142. The non-magnetic piston 142 is provided with engagement portions 146 that are formed complementary to guide rails 144. The guide rails 144 are fixed in position and do not move relative to the piston. For example, the guide rails 144 and the electromagnet 112 can be mounted to the same non-magnetic support, which can be part of an engine block. As shown in FIG. 7, the engagement portions 146 have a concave shape that is complementary to the convex tubular shaped guide rails 144. The complementarily formed engagement portions 146 and the non-magnetic guide rails 144 constrain the movement of the piston 140 to a single degree of freedom (e.g. one direction of movement). Thus, the piston 140 can move in a linear direction when the permanent magnet 142 is repulsed by the electromagnet 112.

The use of the piston 140 and guide rails 144 to constrain the piston is possible because of the use of magnetic force to drive the piston 140. There is no need to provide a compression tight seal around piston 140 in order to cause the piston 140 to move, as in piston and cylinder arrangements of internal combustion engines. Thus, there is no need to provide a sealing engagement between the perimeter of the piston moving within the cylinder, which is a source of friction. Rather, the movement of the piston 140 only needs to be constrained to linear movement and this can be accomplished with guide rails 144 while the piston can be exposed to no more than ambient pressure. The contacting surface between the moving piston 140 and the guide rails 144 can be smaller relative to a piston and cylinder arrangement. In this way, friction forces can be reduced, leading to a more efficient engine. As well, the guide rails are preferably non-magnetic and disposed so as to be free of any influence on the permanent magnet. As seen in FIG. 7, the contacting surfaces between the guide rails and the pistons is limited and does not extend completely around the perimeter of the piston, thus reducing the friction surface between the piston and the guide rails. Further, without the need for compression sealing, complex sealing rings and other parts can be eliminated.

When the electromagnet 112 is energized, the magnetic field repulses the permanent magnet 142 that is mounted on the piston 140. As similarly discussed above, this causes the piston to move, which causes the crankshaft 122 to rotate. The electromagnet 112 can be energized such that it only repulses the permanent magnet 142. Thus, the electromagnet 112 can be intermittently energized to only provide power in the down-stroke of the piston 140. The direction of the current of the electromagnet 112 can also be cyclically reversed such that the electromagnet 112 attracts the permanent magnet 142 in the up-stroke of the piston 140 and repulses the permanent magnetic 142 in the down-stroke of the piston.

Magnetic shielding optionally can be provided around the magnets of the engine. The magnetic shielding provides protection to the electrical components of the engine and an other devices from interference from the magnets. The magnetic shielding deflects the magnetic flux to protect sensitive components while allowing the magnetic flux to operate to drive the pistons of the engine.

From the foregoing it is apparent that the present invention provides an electromagnetic engine which may be produced as a power source for automobiles, trucks, ships, recreational vehicles and the like.

With the hydrocarbon fuel shortage that is presently upon us, the present invention could provide an alternative to internal combustion engines.

Whereas the present invention has been described in particular relation to the drawings attached hereto, other and further modifications apart from those shown or suggested herein may be made within the spirit and scope of the invention.

The invention claimed is:

1. An electromagnetic engine, comprising:
   an electromagnet energizeable so as to have opposing magnetic poles at first and second ends along an axis thereof, the electromagnet having a first magnetic pole orientation in a first energized state, and a second magnetic pole orientation in a second energized state;
   a crankshaft;
   a sensor coupled to the crankshaft and adapted to output a signal as a function of crankshaft position;
   a non-magnetic rigid support coupled to the crankshaft and mounted for oscillatory stroke movement relative to and in the direction of the axis of the electromagnet;
   first and second permanent magnets affixed to the support and on either side of the electromagnet, each permanent magnet being oriented to present the same magnetic pole to each respective end of the electromagnet and being spaced from the other permanent magnet by a distance approximately equal to the distance between the first and second ends of the electromagnet plus the stroke movement of the support;
   a timing circuit operative to switch the electromagnet between the first and second energized states in response to the output signal.

2. The engine as in claim 1, further comprising:
   an alternator coupled to the crankshaft and adapted to convert at least a portion of a rotational energy of the crankshaft into electrical energy.

3. The engine as in claim 2, further comprising:
   a rechargeable power storage device electrically connected to the timing circuit to supply power to energize the electromagnets, wherein the alternator provides electrical energy to recharge the rechargeable power storage device.

* * * * *